(12) United States Patent
Thiesfeld et al.

(10) Patent No.: US 7,005,817 B2
(45) Date of Patent: Feb. 28, 2006

(54) ENERGY CONSERVING DISC DRIVE

(75) Inventors: Charles W. Thiesfeld, Lakeville, MN (US); Hakam D. Hussein, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 705 days.

(21) Appl. No.: 10/104,345

(22) Filed: Mar. 22, 2002

(65) Prior Publication Data

US 2003/0117918 A1    Jun. 26, 2003

Related U.S. Application Data

(60) Provisional application No. 60/342,676, filed on Dec. 21, 2001.

(51) Int. Cl.
  *H02P 3/14*    (2006.01)
(52) U.S. Cl. .................. 318/376; 318/254; 318/138; 318/439
(58) Field of Classification Search ............. 318/376, 318/254, 439, 138, 364, 377, 49, 606; 320/104, 320/6; 360/74.1, 75; 369/47.44
See application file for complete search history.

(56) References Cited

U.S. PATENT DOCUMENTS

| 4,055,789 | A |   | 10/1977 | Lasater ........................... 320/6 |
| 4,237,501 | A |   | 12/1980 | Barmache et al. ............. 360/75 |
| 4,371,903 | A |   | 2/1983  | Lewis .......................... 360/75 |
| 4,658,308 | A |   | 4/1987  | Sander, Jr. .................. 360/74.1 |
| 4,786,995 | A |   | 11/1988 | Stupeck et al. ............... 360/75 |
| 4,831,469 | A |   | 5/1989  | Hanson et al. ................ 360/75 |
| 4,866,554 | A |   | 9/1989  | Stupeck et al. .............. 360/105 |
| 5,057,753 | A |   | 10/1991 | Leuthold et al. ............. 318/254 |
| 5,091,680 | A |   | 2/1992  | Palm .......................... 318/368 |
| 5,426,355 | A |   | 6/1995  | Zweighaft .................... 318/364 |
| 5,504,402 | A |   | 4/1996  | Menegoli ..................... 318/377 |
| 5,633,568 | A |   | 5/1997  | Dunfield ...................... 318/254 |
| 5,701,284 | A | * | 12/1997 | Lee ........................... 369/47.44 |
| 6,020,695 | A |   | 2/2000  | Kelly et al. ................... 318/49 |
| 6,028,411 | A |   | 2/2000  | Motzko et al. ............. 318/606 |
| 6,114,833 | A | * | 9/2000  | Langston et al. ........... 320/109 |
| 6,166,503 | A |   | 12/2000 | Korbel et al. ............... 318/434 |
| 6,267,190 | B1 | * | 7/2001  | Micheletti .................... 180/183 |
| 6,326,765 | B1 |   | 12/2001 | Hughes et al. .............. 320/104 |

* cited by examiner

*Primary Examiner*—Karen Masih
(74) *Attorney, Agent, or Firm*—Westman, Champlin & Kelly

(57) ABSTRACT

A disc drive includes a disc mounted to a rotatable spindle, a motor coupled to the spindle, and motor control circuitry. The motor has a motoring mode in which it rotates the spindle and a braking mode in which is decelerates the rotating spindle and generates power. The motor control circuitry is adapted to control the modes of the motor. The disc drive also includes an auxiliary power output that is generated while operating the motor in the braking mode. The auxiliary power output is made accessible to electronic components that are collateral to the disc drive.

29 Claims, 4 Drawing Sheets

ENERGY CONSERVING DISC DRIVE

CROSS-REFERENCE TO RELATED APPLICATION

This application claims priority from U.S. Provisional Application No. 60/342,676 filed on Dec. 21, 2001 for inventors Charles W. Thiesfeld and Hakam D. Hussein and entitled "SPINDOWN POWER SAVER."

FIELD OF THE INVENTION

The present invention relates to disc drives and, more particularly, to a disc drive that conserves energy by providing an auxiliary power output that is generated in response to braking of a spindle motor.

BACKGROUND OF THE INVENTION

Disc drives, such as magnetic storage disc drives, optical disc drives, compact disc (CD) drives, digital video disc (DVD) drives, and other types of disc drives that are commonly used in digital processing systems, generally include a disc mounted to a rotatable spindle, a spindle motor adapted to rotate the spindle, and motor control circuitry that is adapted to control the motor.

Portable digital processing systems that use such disc drives include, for example, laptop computers, portable CD players, portable DVD players, and MP3 audio players. These systems include a battery for providing power to the disc drive as well as other electronic components of the system that are collateral to the disc drive. These collateral electronic components include data processing electronics used to process the data stored on the recording medium of the disc drive, voltage regulators, battery chargers and other electronic components.

The limited power supply that is available for such portable digital processing systems is of continuous concern. Efforts are made to maximize battery life while minimizing sacrifices in performance using various power saving techniques.

The disc drives of such systems are often the largest consumers of battery power. In particular, the spindle motor of the disc drive consumes a large amount of power during startup routines, when the disc medium must be accelerated to an operating angular velocity, typically 5,400 RPM and greater for magnetic disc drive storage systems. The power consumed during such a startup routine depends, in part, upon the number of discs in the disc drive and the operational velocity that must be attained. The power consumed by the disc drive is exacerbated when the disc drive is frequently stopped and started. This commonly occurs with CD disc drives, DVD disc drives, and disc drives used in MP3 audio players. Although magnetic disc drive storage systems are fairly efficient at maintaining the operating speed, the spindle motor can unnecessarily consume a large amount of battery power during long idle periods when no transfer of data to or from the disc drive is occurring. As a result, it is common practice to shutdown the disc drive during these periods of non-use and restart it when a data exchange is desired.

When the disc drive is shutdown, the kinetic energy of the rotating disc or discs is generally lost to heat energy. Some magnetic disc drive storage systems convert the kinetic energy of the disc and spindle during an abrupt power loss into electrical energy by braking the spindle motor. The generated energy is then provided to other components of the disc drive to transport transducing heads, which are used to read and write data to the discs, into a shutdown position without damaging them or the disc media. Although these systems are effective in providing a controlled shutdown of the disc drive, they do not address issues relating to extending battery life of portable digital processing systems.

There is a continuing need to extend battery life in portable digital processing systems. One source of energy that is yet to be utilized to extend battery life is the kinetic energy of the rotating discs of the disc drive that is used in such systems. It would be desirable to convert this energy for use by electronic components that are collateral to the disc drive to conserve battery power.

SUMMARY OF THE INVENTION

The present invention generally relates to a disc drive that conserves the kinetic energy of the rotating disc and spindle by converting it into electrical energy that can be used by electronic components that are collateral to the disc drive. The disc drive includes a disc mounted to a rotatable spindle, a motor coupled to the spindle, and motor control circuitry. The motor has a motoring mode in which it rotates the spindle and a braking mode in which it decelerates the rotating spindle and generates power. The motor control circuitry is adapted to control the modes of the motor. The disc drive further includes an auxiliary power output that is generated while operating the motor in the braking mode. The auxiliary power output is made accessible to electronic components that are collateral to the disc drive.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
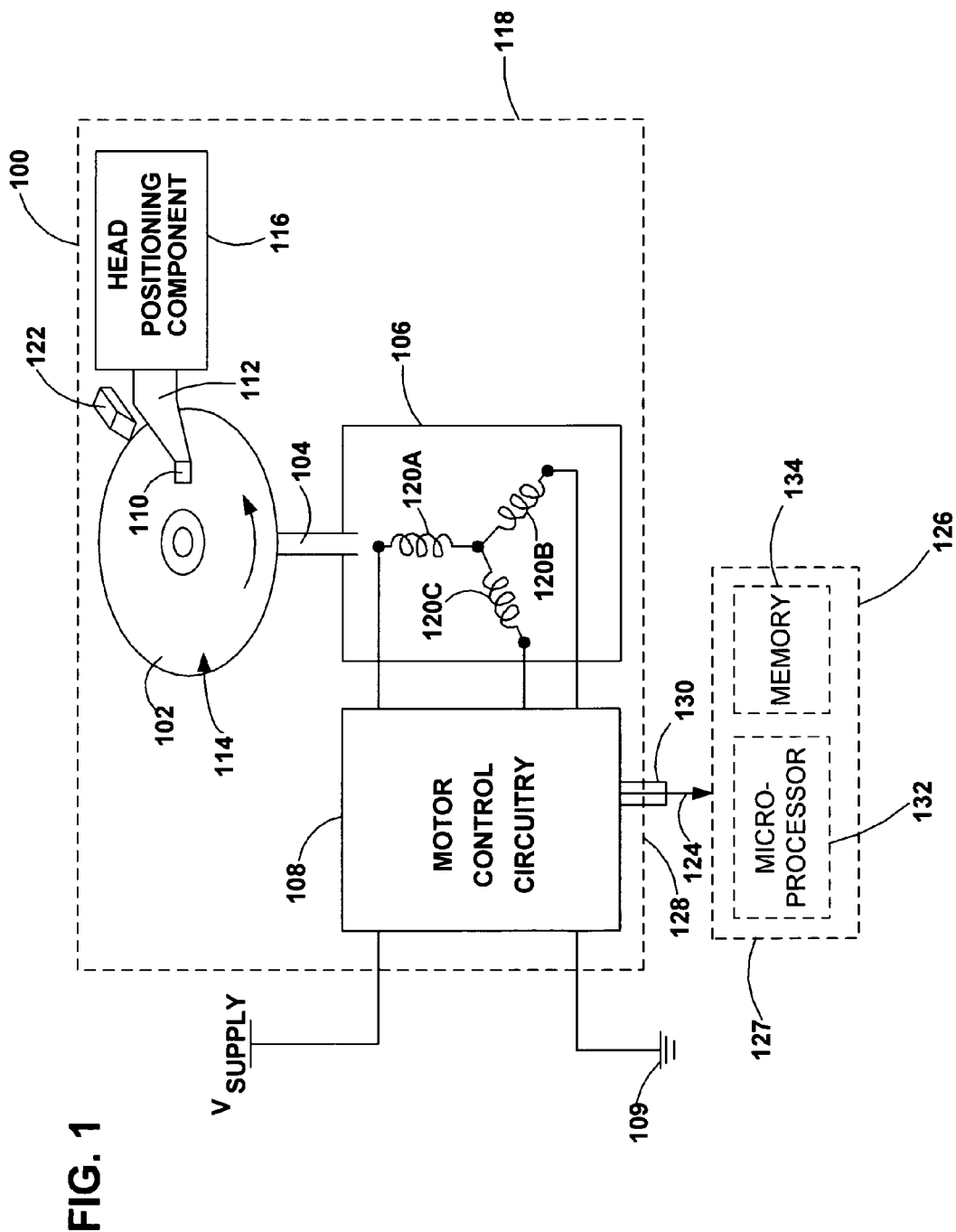
FIG. 1 is a simplified diagram of a magnetic disc drive storage system in accordance with an embodiment of the invention.

FIG. 1 is a simplified diagram of a magnetic disc drive storage system 100, in accordance with an embodiment of the present invention. It should be understood that the present invention applies equally to other types of disc drives, such as optical disc drives, compact disc (CD) drives, digital video disc (DVD) drives, etc. Furthermore, it is intended that the disc drive of the present invention operate as a component of a digital processing system, such as a laptop computer, a portable CD player, a portable DVD player an MP3 player, or other digital processing system where energy conservation is desired.

In general, disc drive 100 includes at least one disc 102 that is mounted to a rotatable spindle 104. A motor 106 rotates the disc 102 and spindle 104 when in a motoring mode and decelerates or brakes the disc 102 and spindle 104 when in a braking mode. Motor control circuitry 108 controls the motor 106 including the various modes of operation. Motor 106, motor control circuitry 108, and other components of disc drive 100 receive power ($V_{supply}$) from a battery or other source. A connection to ground level voltage 109 is also provided.

Disc 102 is a magnetic disc on which data is written to and read from by a transducing head 110. Head 110 is carried by a slider that is mounted to a suspension assembly 112 that includes a track accessing arm and supports head 110 proximate a surface 114 of disc 102. Head positioning component 116, such as a rotary moving coil actuator, positions head 110 over a data track so that the desired read or write operation can be performed. A housing 118, represented by the dashed box, can substantially enclose the components of disc drive 100.

Spindle motor 106 includes coils 120A–C, which are connected to motor control circuitry 108. In the motoring mode, motor control circuitry 108 selectively applies pulse width modulated (PWM) control voltages to coils 120A–C in spindle drive motor 106 to cause spindle 104 and disc 102 to rotate at a desired speed. The braking mode involves a "generating" period in which coils 120A–C are electrically shorted. During this period a voltage exists across the coils 120A–C due to the continued rotation of the motor, which causes a current to flow in the coils and motor control circuitry 108. This current is associated with a torque that opposes the motion of motor 106, thereby "braking" the motor and slowing the rotation of disc 102 and spindle 104. To avoid damaging coils 120A–C, motor control circuitry 108 keeps the generating period brief. In accordance with the present invention, after the generating period, the braking mode enters a "release" period, during which the energy generated by the coils is released. The generating and release periods of the braking mode are controlled by signals from motor control circuitry 108, such that the shorting of the coils 120A–C occurs for brief moments to limit the maximum surge current that is conducted through the coils.

In accordance with the present invention, disc drive 100 also includes an auxiliary power output 124 that receives the released energy generated by the spindle motor 106 when in the braking mode. In this manner, the kinetic energy of the rotating disc 102 and spindle 104 can be conserved and used to power an electronic component 126 that is collateral to disc drive 100. The auxiliary power output 124 is provided to electronic component 126 through a power output port 128 that generally includes a conductor 130 extending through the housing 118. Alternatively, auxiliary power output 124 could be conducted back through the power input pin, through which $V_{supply}$ is received by disc drive 100, by using suitable power routing circuitry that prevents the backflow of current to the power supply.

The electronic component 126 generally operates as a collateral component within the same digital processing system as disc drive 100, and can be external to disc drive 100 when disc drive 100 is substantially enclosed by housing 118. Electronic component 126 can be, for example, data processing electronics 127 that include a microprocessor 132 and memory 134, a battery charger, a voltage regulator, or other collateral electronic component.

The amount of power that is generated when in the braking mode depends upon the kinetic energy of the rotating disc 102 and the spindle 104. The kinetic energy (K) depends on the moment of inertia (I) and the angular velocity (ω) of the disc 102 and spindle 104 in accordance with the following relationship:

$$K = \tfrac{1}{2} I \omega^2$$

The energy produced while in the braking mode is directly related to the change in kinetic energy (ΔK) of the rotating disc 102 and spindle 104, which can be represented by the following equation:

$$\Delta K = \tfrac{1}{2} I (\Delta \omega)^2$$

where Δω represents a change in angular velocity of the disc 102 and spindle 104.

Typical magnetic disc drives have operating speeds in the range of 5400–15000 rpm. Additionally, these disc drives may contain several discs. As a result, the kinetic energy of the disc or discs 102 and spindle 104 during normal operation can vary substantially from drive to drive. It is possible to generate more than 2 Watts during braking of spindle motor 106 for even the disc drives having the slower operating speeds.

Figure 2:
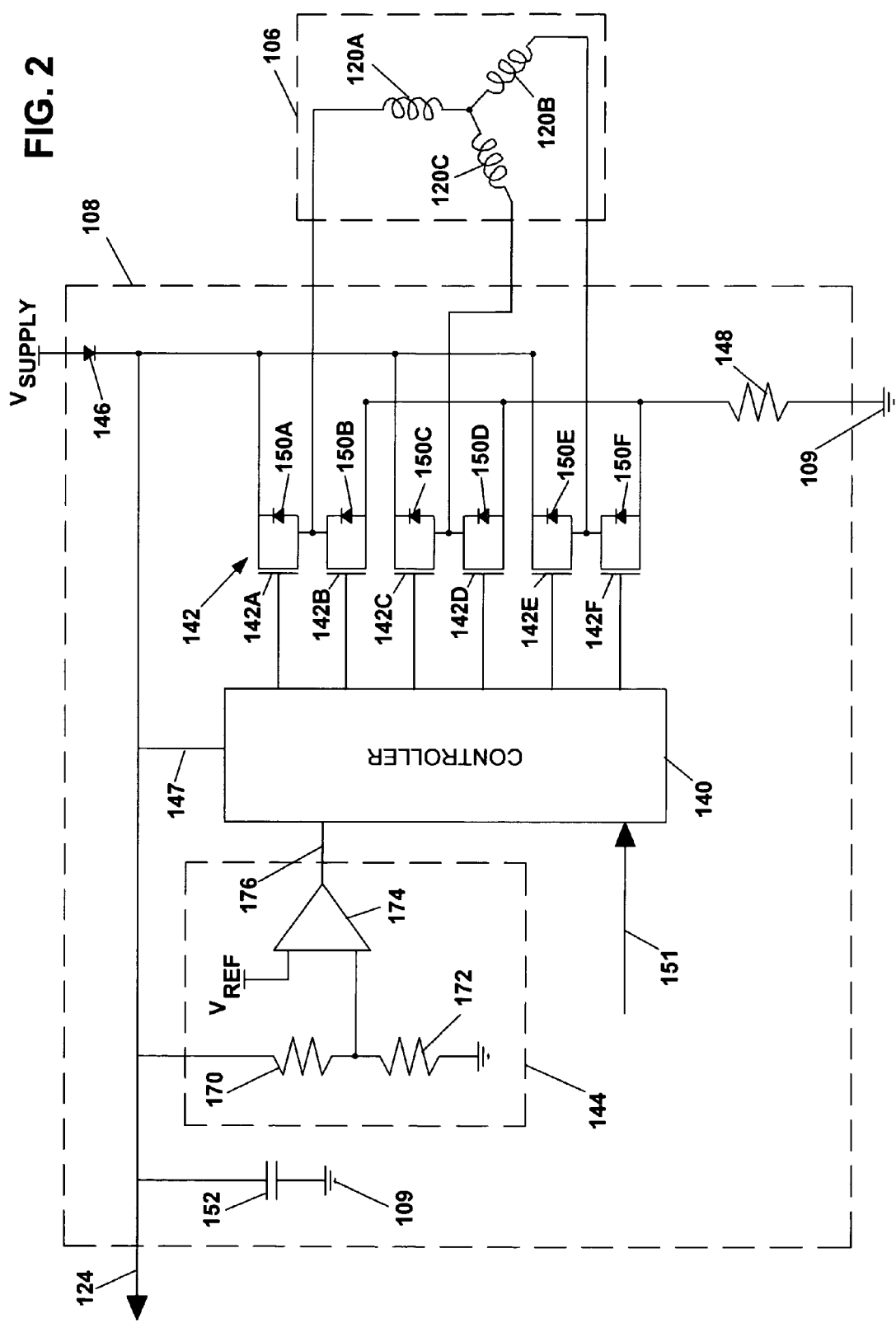
FIG. 2 is a schematic diagram of motor control circuitry in accordance with an embodiment of the invention.

FIG. 2 shows a schematic diagram of motor control circuitry 108 in accordance with an embodiment of the invention. Motor control circuitry 108 generally includes a controller 140, a switch array 142, and a voltage comparator circuit 144. The power supply provides the supply voltage $V_{supply}$ to controller 140 through diode 146 and line 147. Diode 146 prevents the backflow of current to the power supply.

Switch array 142 includes individual switches 142A–F, which are shown as field effect transistors (FET's). The gates of the FET's 142A–F are coupled to controller 140, which controls their "on" or "off" state. The drains of FET's 142A, 142C and 142E are coupled to $V_{supply}$ through diode 146. The drains of FET's 142B, 142D and 142F are respectively coupled to the sources of the FET's 142A, 142C and 142E and to coils 120A–C. The sources of FET's 142B, 142D and 142F are coupled to ground 109 through a resistor 148. Diodes 150A–F are connected between the drain and the sources of FET's 142A–F, respectively.

In the motoring mode of operation, controller 140 sends control signals to the gates of FET's 142A–F so that power is selectively applied to coils 120A, 120B and 120C of spindle motor 106. For example, when the gates of FET's 142C and 142F are at a "high" voltage level from controller 140, an electrical voltage is applied to coils 120B and 120C, which completes an electrical circuit between the power supply $V_{supply}$ and electrical ground 109. By properly sequencing the voltages applied to the gates of FET's 142A–F, controller 140 causes spindle 104 and disc 102 (FIG. 1) to rotate. The signals applied to transistors 142A–F by controller 140 are pulse width modulated to control the speed at which motor 106 drives spindle 104 and disc 102.

Figure 3:
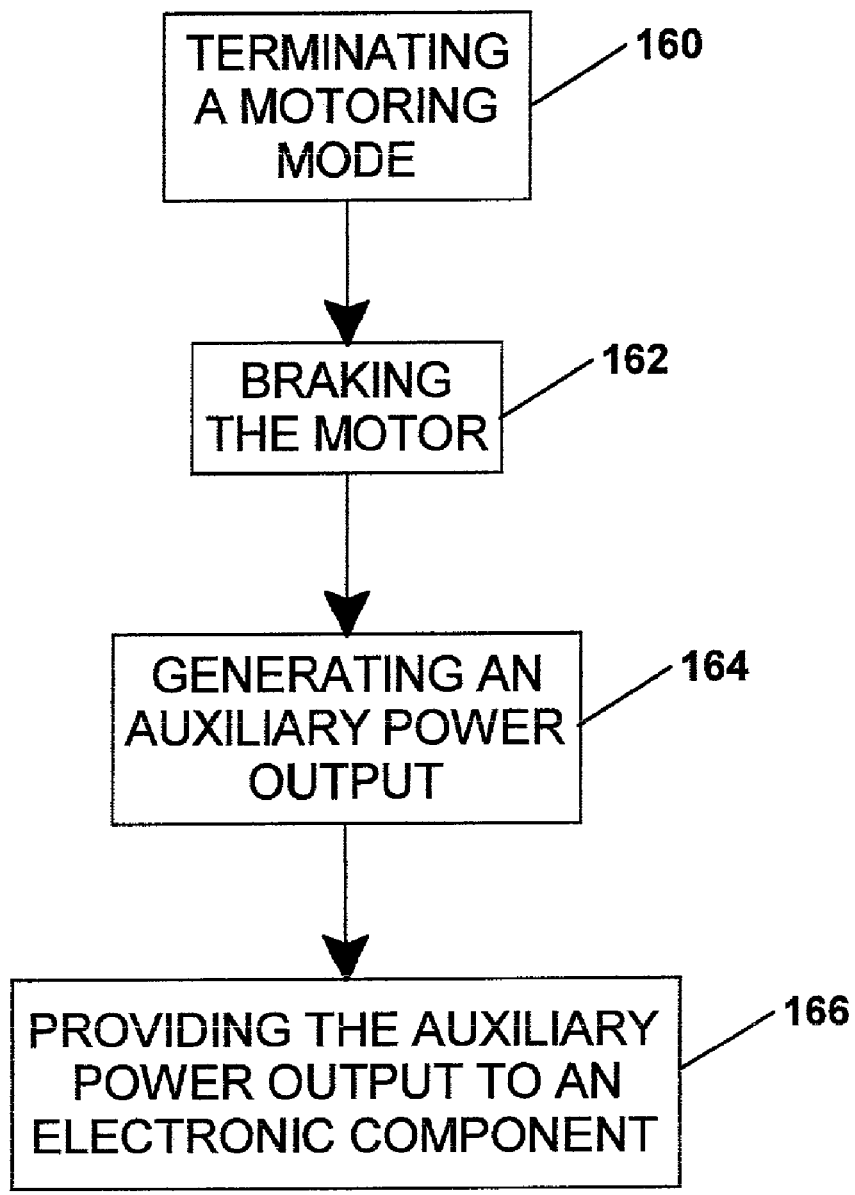
FIG. 3 is a flowchart illustrating a shutdown routine for a disc drive in accordance with an embodiment of the invention.

During a shutdown routine, the motoring mode of operation is terminated, as indicated at step 160 of the flowchart of FIG. 3. This can occur in response to a shutdown or power-off condition where supply $V_{supply}$ is terminated, notice of which can be provided to controller 140 by a signal on line 151, shown in FIG. 2. For example, upon termination of the power supply $V_{supply}$, controller 140 may detect that the signal on line 151 has gone to a low value. Controller 140 remains alive during the power-off condition due to the charge on bypass capacitor 152.

Next, controller 140 causes spindle motor 106 to enter the braking mode, as indicated at step 162 of FIG. 3. Initially, controller 140 turns on transistors 142B, 142D and 142F. During this generating period, a voltage is generated across the coils 120A–C due to the rotation of the motor, which causes a current to flow in a circular path through the coils 120A-C and transistors 142B, 142D and 142F. None of the corresponding diodes 150B, 150D and 150F are conducting. As mentioned above, this current is associated with a torque that opposes the motion of motor 106, which slows the rotation of disc 102 and spindle 104. Next, controller 140 turns all of the transistors 142A–F off to begin the energy release period. Due to the inductive nature of the coils 120A–C, the generated current flows through diodes 150A–F and transfers charge into bypass capacitor 152. This replenishes the charge on bypass capacitor 152, which provides energy to maintain power to controller 140 and produces the auxiliary power output 124, as indicated at step 164 of FIG. 3. Finally, at step 166, the auxiliary power output is provided to an electronic component 126 (FIG. 1). Controller 140 can then turn on transistors 142B, 142D and 142F to start another generating period followed by an energy release period.

It is desirable to maintain the voltage across bypass capacitor 152 at a relatively constant value. This is accomplished using voltage comparator circuit 144, shown in FIG. 2. The purpose of voltage comparator circuit 144 is to signal controller 140 when the voltage of auxiliary power output 124 or that across bypass capacitor 152 drops below a threshold value. Voltage comparator circuit 144 includes a voltage divider formed by a resistors 170 and 172 and a comparator 174. The voltage across resistor 172 is compared to a reference voltage $V_{Ref}$. The output from comparator 174 is provided to controller 140 along line 176, which signals controller 140 that the voltage has dropped below the threshold value $V_{Ref}$ by, for example, changing from a high voltage state to a low voltage state. The reference voltage $V_{Ref}$ is preferably maintained at approximately 1–2V in accordance with known methods. Resistors 170 and 172 are selected such that the voltage across resistor 172 is at or above the reference voltage $V_{Ref}$ when the voltage at capacitor 152 is at the desired level of 5–10V, for example.

During a shutdown routine, when controller 140 receives a signal from comparator circuit 144 that the voltage at auxiliary output 124 has dropped too low, controller 140 commences the braking of motor 106. The voltage across capacitor 156 then builds until it reaches the desired level, at which time voltage comparator circuit 144 signals controller 140 that the braking mode can be terminated. In this manner, the auxiliary power output can be maintained at a near constant voltage for a period of time while motor 106 is braked to thereby provide the desired auxiliary power output to electronic component 126.

Figure 4:
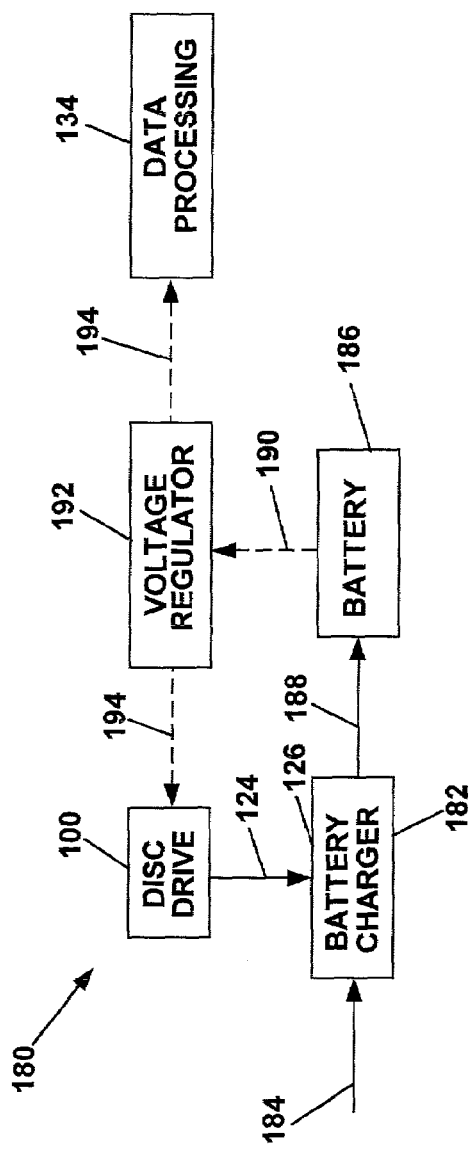
FIGS. 4 and 5 are simplified block diagrams of digital processing systems that include a disc drive in accordance with embodiments of the present invention.
Figure 5:
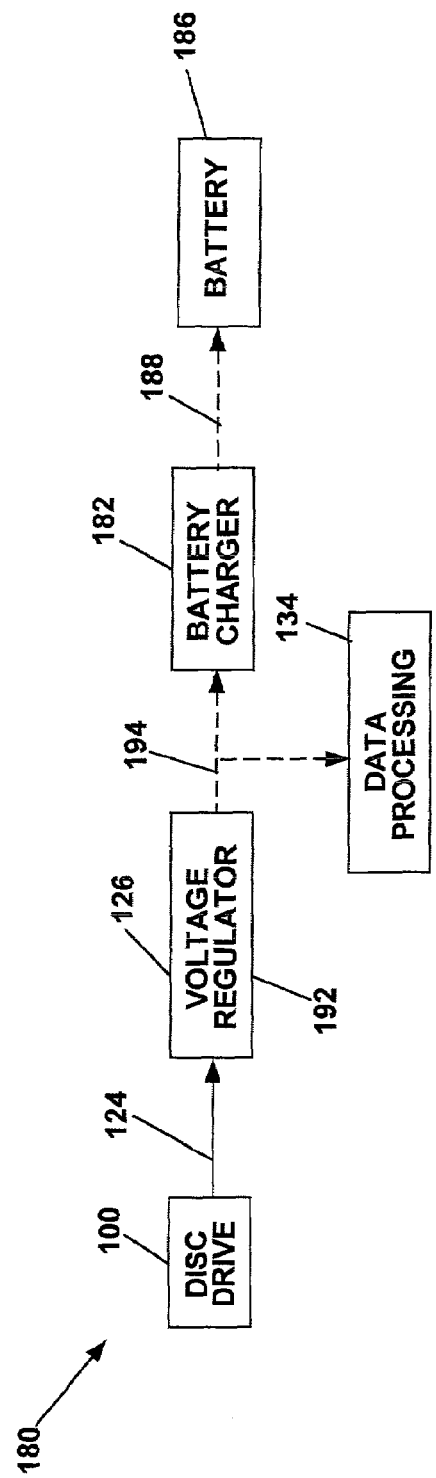

FIGS. 4 and 5 show simplified block diagrams of two digital processing systems 180 that include a disc drive 100 in accordance with embodiments of the present invention. In FIG. 4, the electronic component 126 that receives auxiliary power output 124 is a battery charger 182. Additionally, battery charger 182 can receive a line-level power input 184 for traditional battery charging operations. Battery 186 is charged by power from charger 182 provided along line 188 in response to auxiliary power output 124. In accordance with one embodiment of the invention, battery 186 has an output voltage, provided along line 190, that can be regulated by a voltage regulator 192 to regulate the output voltage from, for example, 7 V to 5 V. A regulated output voltage 194 is generated by voltage regulator 192 in response to the output voltage from battery 186, which can be provided to data processing electronics 127, disc drive 100, or other electronic component of digital processing system 180.

In the digital processing system 180 of FIG. 5, the auxiliary power output 124 produced by disc drive 100 in response to the braking of motor 106 is provided directly to a voltage regulator 192. Voltage regulator 192 produces a regulated output voltage 194 in response to the auxiliary power output and preferably regulates the voltage to 5 V. Regulated output voltage 194 can then be provided to other electronic components 126 of digital processing system 180, such as a battery charger 182, which charges battery 186, data processing electronics 127, or other electronic component of digital processing system 180.

In summary, one aspect of the present invention is directed to a disc drive (such as 100) that includes a disc (such as 102) that is mounted to a rotatable spindle (such as 104), a motor (such as 106), motor control circuitry (such as 108), and an auxiliary power output (such as 124). The motor is coupled to the spindle and has a motoring mode in which it rotates the spindle and a braking mode in which is decelerates the rotating spindle and generates power. The motor control circuitry is adapted to control the modes of the motor. The auxiliary power output is generated while the motor is operated in the braking mode and is made accessible to an electronic component (such as 126) that is collateral to the disc drive. The disc drive can also include a housing (such as 118) that substantially encloses the disc and the motor. A power output port (such as 128) can be provided that includes a conductor (such as 130) that extends through the housing. This allows an electronic component that is external to the housing to access the auxiliary power output. The disc drive can be a magnetic disc drive storage system, an optical disc drive storage system, a compact disc (CD) drive, or a digital video disc (DVD) drive. As a magnetic disc drive storage system, the disc drive includes a transducing head (such as 110), a suspension assembly (such as 112), and a head positioning component (such as 116). The suspension assembly includes a distal end that is coupled to the transducing head and a proximal end. The head positioning component is coupled to the proximal end of the suspension assembly and is adapted to control the position of the head relative to a surface (such as 114) of the disc.

Another aspect of the present invention is directed to a digital processing system (such as 180) that includes the above-described disc drive. In accordance with one embodiment of the invention, the digital processing system includes the above-described disc drive and an electronic component (such as 126) that is collateral to the disc drive and is electrically coupled to the auxiliary power output. The electronic component can be a battery charger (such as 182), data processing electronics (such as 127) having a microprocessor (such as 132) and memory (such as 134), a voltage regulator (such as 192), or other electronic component that is collateral to the disc drive. The battery charger can charge a battery (such as 186) using the power supplied by the auxiliary power output. The voltage regulator can include a regulated power output (such as 194) that is produced in response to the auxiliary power output.

Another aspect of the present invention is directed to a method of shutting down a disc drive. In the method, a motoring mode in which a motor rotates a spindle of the disc drive is terminated (such as at step 160). Next, the motor is braked (such as at step 162) and an auxiliary power output is generated in response thereto (such as at step 164). Finally, the auxiliary power output is provided to an electronic component that is collateral to the disc drive (such as at step 166). In accordance with one embodiment, the motoring mode is terminated in response to a signal (such as 151) that indicates the loss of power from a power supply (such as $V_{supply}$).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. The particular elements may vary depending on the particular application for the disc drive while maintaining substantially the same functionality without departing from the scope and spirit of the present invention. For example, the auxiliary power output may also be provided to an integral component of the disc drive. In addition, although the preferred embodiment described herein is directed to a magnetic disc drive storage system, it will be appreciated by those skilled in the art that the teachings of the present invention can be applied to other disc drives such as optical disc drives, CD drives, and DVD drives, without departing from the scope and spirit of the present invention.

What is claimed is:

1. A data storage device comprising:
   a rotatable spindle;
   a motor coupled to the spindle, the motor having a braking mode in which it decelerates the rotating spindle and generates power;
   motor control circuitry adapted to control the motor; and
   a power output generated while operating the motor in the braking mode, the power output being accessible to an electronic component that is collateral to the data storage device.

2. The device of claim 1, including:
   a housing substantially enclosing the motor; and
   a power output port electrically coupled to the power output and having a conductor that extends through the housing, whereby an electronic component external to the housing can access the power output.

3. The device of claim 1, wherein the data device includes a magnetic disc drive storage system, an optical disc drive storage system, a compact disc (CD) drive, or a digital video disc (DVD) drive.

4. The device of claim 1, wherein the data storage device includes:
   a transducing head;
   a suspension assembly having a distal end coupled to the transducing head and a proximal end; and
   a head positioning component coupled to the proximal end of the suspension assembly and adapted to control the position of the head.

5. The device of claim 1 including an electronic component that is collateral to the disc drive and electrically coupled to the power output.

6. A digital processing system comprising:
   a power supply;
   a data storage device including:
      a rotatable spindle;
      a motor coupled to the spindle, the motor having a braking mode in which it decelerates the rotating spindle and generates power;
      motor control circuitry adapted to control the motor; and
      a power output generated while operating the motor in the braking mode, the power output being accessible to an electronic component that is located externally to the data storage device; and
   a charger electrically coupled to the power output and adapted to charge the power supply therewith.

7. The system of claim 6, further comprising data processing electronics including a microprocessor and memory, which are powered by the power supply.

8. The system of claim 6, including a voltage regulator electrically coupled to the power supply and providing a regulated voltage output, wherein the disc drive is powered by the regulated voltage output.

9. The system of claim 6, wherein the data storage device includes:
   a housing substantially enclosing, the motor and the motor control circuitry; and
   a power output port including a conductor extending through the housing and electrically coupled to the power output and the charger.

10. The system of claim 6, wherein the data storage system includes a magnetic disc drive storage system, an optical disc drive storage system, a compact disc (CD) drive, or a digital video disc (DVD) drive.

11. The system of claim 6, wherein the data storage system includes:
    a transducing head;
    a suspension assembly having a distal end coupled to the transducing head and a proximal end; and
    a head positioning component coupled to the proximal end of the suspension assembly and adapted to control the position of the head.

12. A digital processing system comprising:
    a data storage system including:
       a rotatable spindle;
       a motor coupled to the spindle, the motor having a braking mode in which it decelerates the rotating spindle and generates power;
       motor control circuitry adapted to control the motor; and
       a power output generated while operating the motor in the braking mode, the power output being accessible to an electronic component that is located externally to the data storage device; and
    an electronic component that is collateral to the data storage device and electrically coupled to the power output.

13. The system of claim 12, wherein the electronic component includes a charger.

14. The system of claim 12, wherein the electronic component includes a microprocessor and memory.

15. The system of claim 12, wherein the electronic component includes a voltage regulator, which includes a regulated power output that is produced in response to the power output.

16. The system of claim 15, including a charger or data processing electronics coupled to the regulated power output.

17. The system of claim 15, wherein the data storage system includes:
    a housing substantially enclosing the motor control circuitry; and
    a power output port including a conductor extending through the housing and electrically coupled to the power output and the electronic component.

18. The system of claim 12, wherein the data storage system includes a magnetic disc drive storage system, an optical disc drive storage system, a compact disc (CD) drive, or a digital video disc (DVD) drive.

19. The system of claim 12, wherein the data storage system includes:
   a transducing head;
   a suspension assembly having a distal end coupled to the transducing head and a proximal end; and
   a head positioning component coupled to the proximal end of the suspension assembly and adapted to control the position of the head.

20. A method of shutting down a data storage system that includes a rotatable spindle and a motor coupled to the spindle, the method comprising steps of:
   a) terminating a motoring mode in which the motor rotates the spindle;
   b) braking the motor;
   c) generating a power output in response to the braking of the motor; and
   d) providing the power output to an electronic component that is collateral to the data storage system.

21. The method of claim 20, including a step e) of regulating the power output for use by a charger or data processing electronics.

22. The method of claim 20, the method includes a step e) of using the power output to charge a battery.

23. The method of claim 20, wherein the terminating step a) is performed in response to a signal indicating loss of power from a power supply.

24. The method of claim 20, wherein the braking step b) involves rapidly switching the motor between a generating mode and a current release mode.

25. A data storage system comprising:
   a rotatable spindle;
   a motor coupled to the spindle, the motor having a braking mode; and
   a power output means for producing an power output that is generated when the motor is in the braking mode and is accessible by an electronic component that is collateral to the data storage system.

26. The data storage system of claim 25 including
   a voltage regulator electrically coupled to the power output and adapted to produce a regulated power output in response thereto.

27. The data storage system of claim 26 including:
   a battery; and
   a battery charger adapted to charge the battery using the regulated power output.

28. The data storage system of claim 26 including digital processing electronics powered by the regulated power output and including a microprocessor and memory.

29. The data storage system of claim 25 including
   an electronic component that is collateral to the disc drive and electrically coupled to the power output means, the electronic component being a voltage regulator, a battery charger, or digital processing electronics.

\* \* \* \* \*